United States Patent
Rivaya

(10) Patent No.: US 10,933,994 B2
(45) Date of Patent: Mar. 2, 2021

(54) SYSTEMS AND METHODS FOR DELIVERING A PACKAGE FROM A DRONE TO A VEHICLE

(71) Applicant: Ford Global Technologies, LLC, Dearborn, MI (US)

(72) Inventor: Jorge Suarez Rivaya, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 16/167,311

(22) Filed: Oct. 22, 2018

(65) Prior Publication Data

US 2020/0122831 A1 Apr. 23, 2020

(51) Int. Cl.
*B64C 39/02* (2006.01)
*B64D 1/12* (2006.01)
*G06Q 10/08* (2012.01)
*G06Q 50/28* (2012.01)
*B64D 9/00* (2006.01)

(52) U.S. Cl.
CPC .............. *B64C 39/024* (2013.01); *B64D 1/12* (2013.01); *B64D 9/00* (2013.01); *G06Q 10/083* (2013.01); *G06Q 50/28* (2013.01); *B64C 2201/128* (2013.01)

(58) Field of Classification Search
CPC ... B64C 39/024; B64C 2201/128; B64D 1/12; B64D 9/00; G06Q 10/083; G06Q 50/28
See application file for complete search history.

(56) References Cited

U.S. PATENT DOCUMENTS

| 9,302,770 | B2 | 4/2016 | Burgess et al. | |
| 9,975,651 | B1 | 5/2018 | Eck et al. | |
| 2015/0370251 | A1 | 12/2015 | Siegel et al. | |
| 2017/0039510 | A1 | 2/2017 | Ogilvie et al. | |
| 2018/0225628 | A1* | 8/2018 | Roy | A47G 29/141 |
| 2018/0261112 | A1* | 9/2018 | O'Brien | B64D 1/08 |
| 2020/0046156 | A1* | 2/2020 | Holzer | B64F 1/32 |

FOREIGN PATENT DOCUMENTS

WO 2018/093396 A1 5/2018

OTHER PUBLICATIONS

Kim, Jaeho, "UAV Management System based on IoT Platform & U2X Networks," Korean Electronics Institute, IEEE 5G-IoT Summit Helsinki, Published Sep. 18, 2017 (13 pages).

* cited by examiner

*Primary Examiner* — Michael D Lang
(74) *Attorney, Agent, or Firm* — Brandon Hicks; Eversheds Sutherland (US) LLP

(57) ABSTRACT

Systems and methods are disclosed for delivering a package from a drone to a vehicle. In some instances, the method may include identifying the vehicle by the done. A wireless communication connection may be established between the drone and the vehicle. The vehicle may open an access door of the vehicle to expose an opening in the vehicle. A net configured to receive the package from the drone may be disposed within the vehicle below the opening. The drone may release the package into the net.

17 Claims, 17 Drawing Sheets

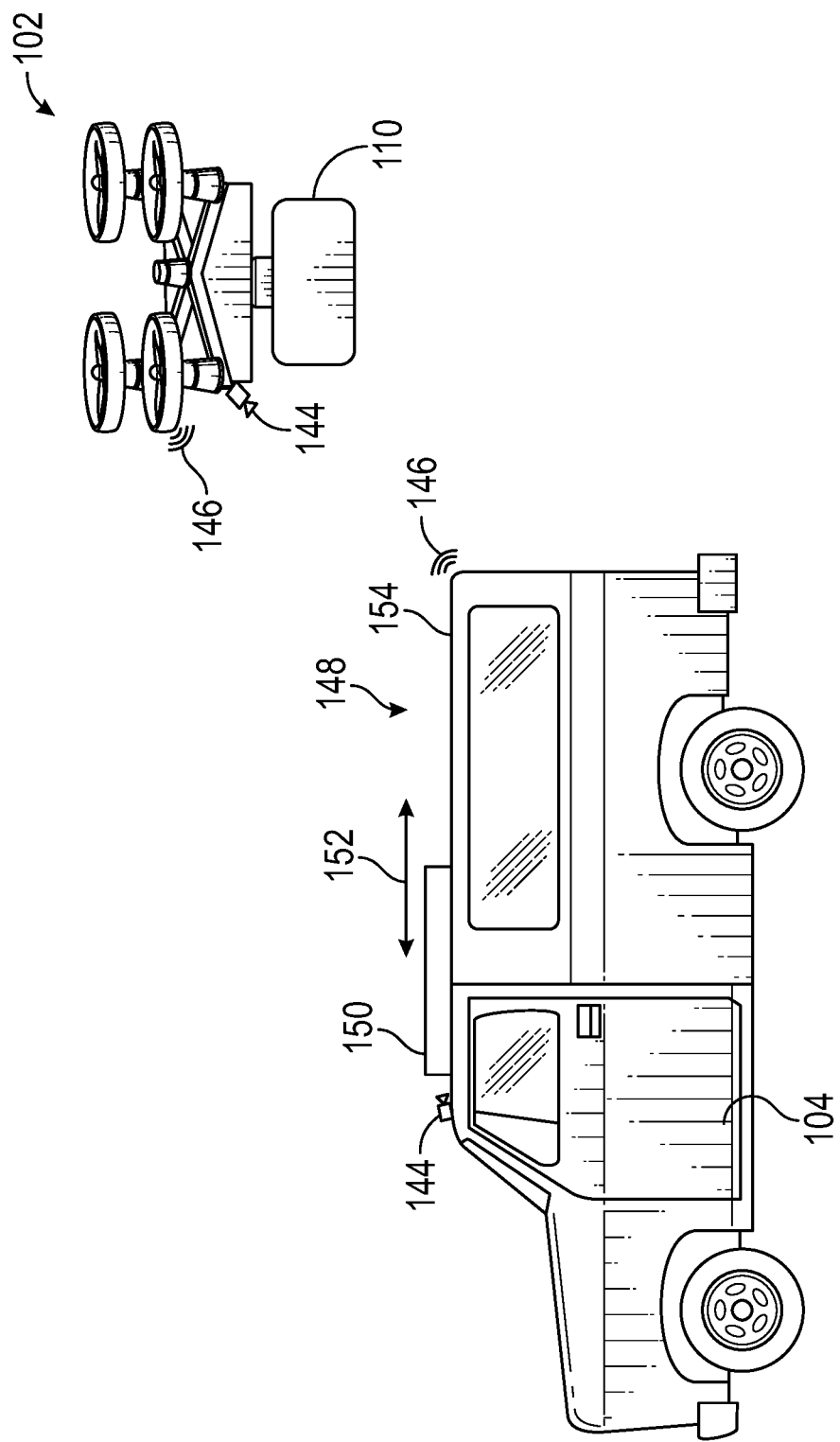

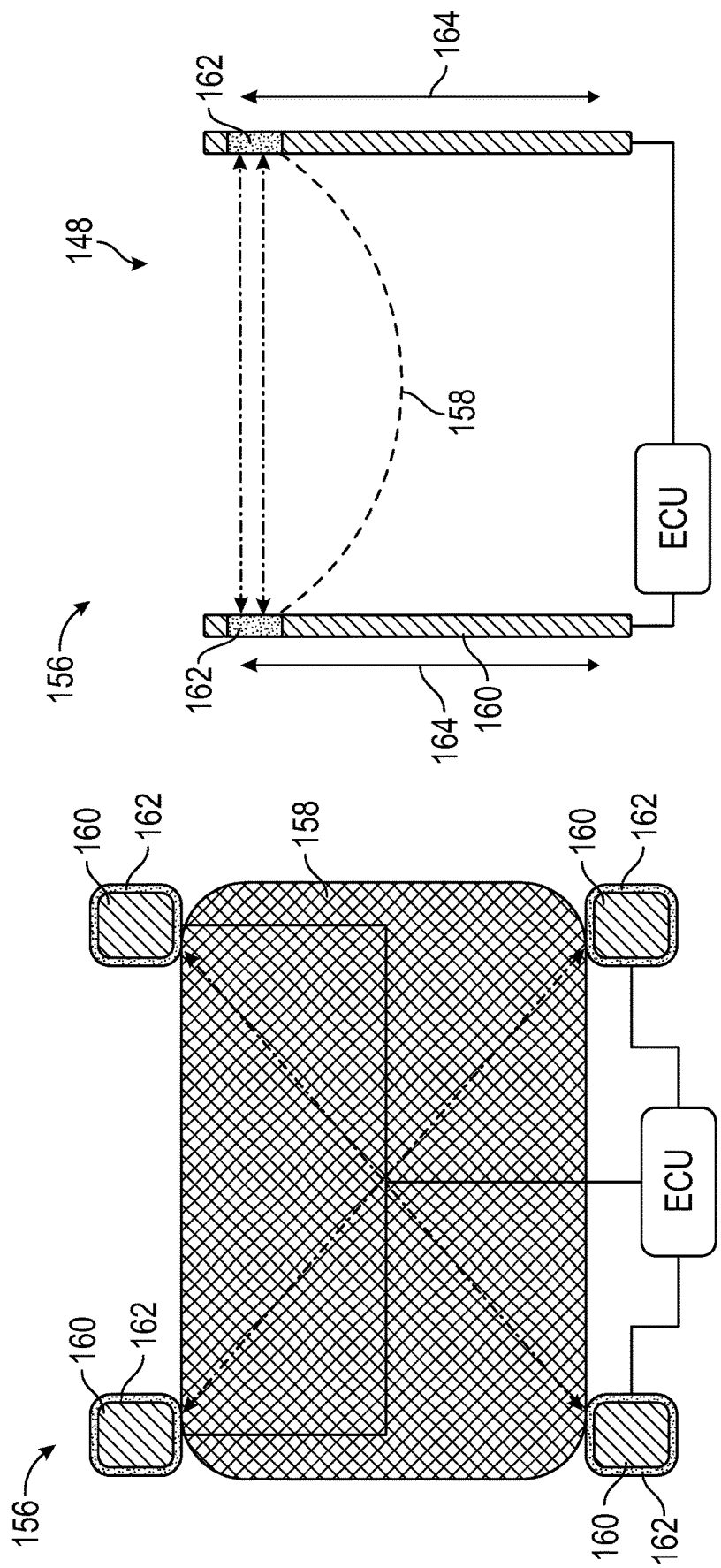

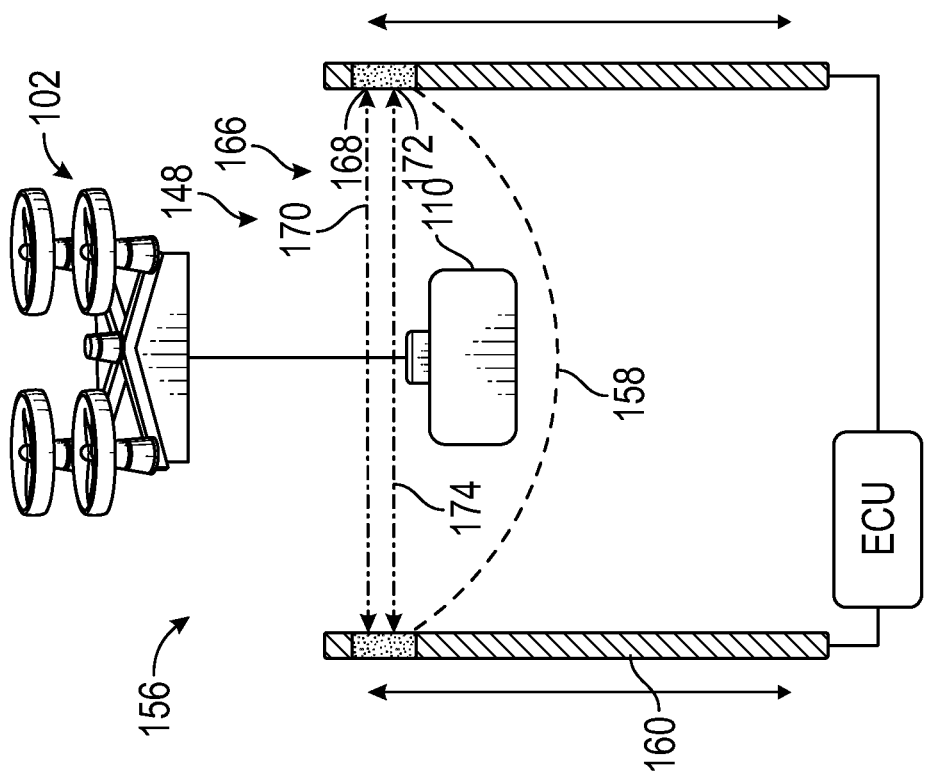
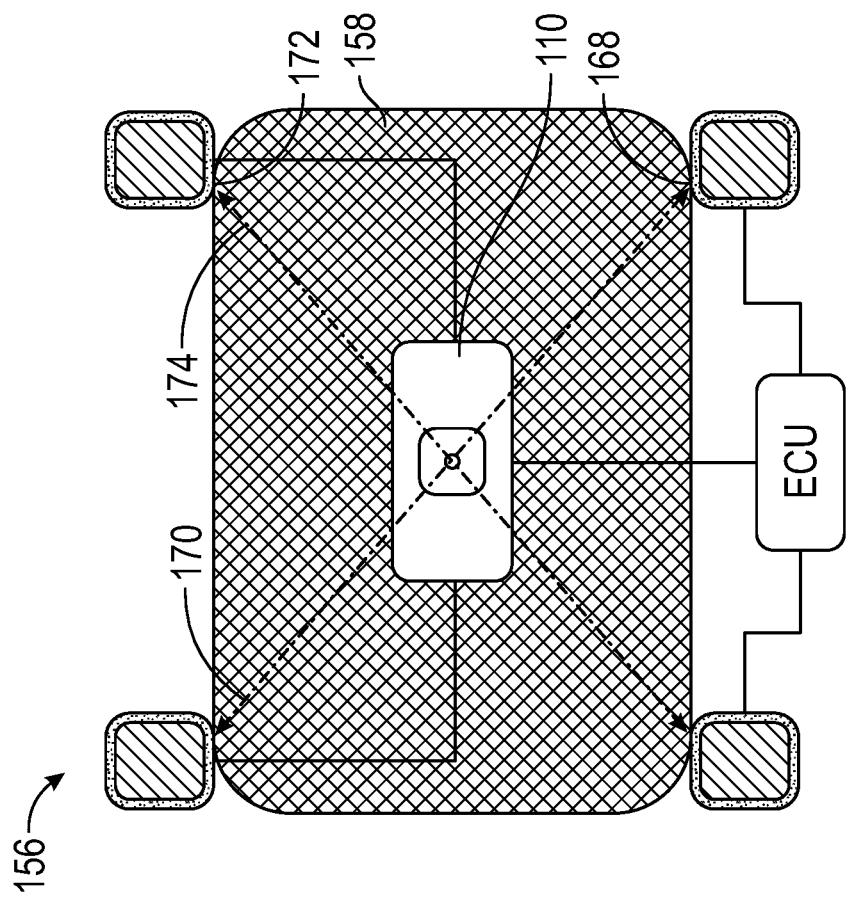
FIG. 10B
FIG. 10A

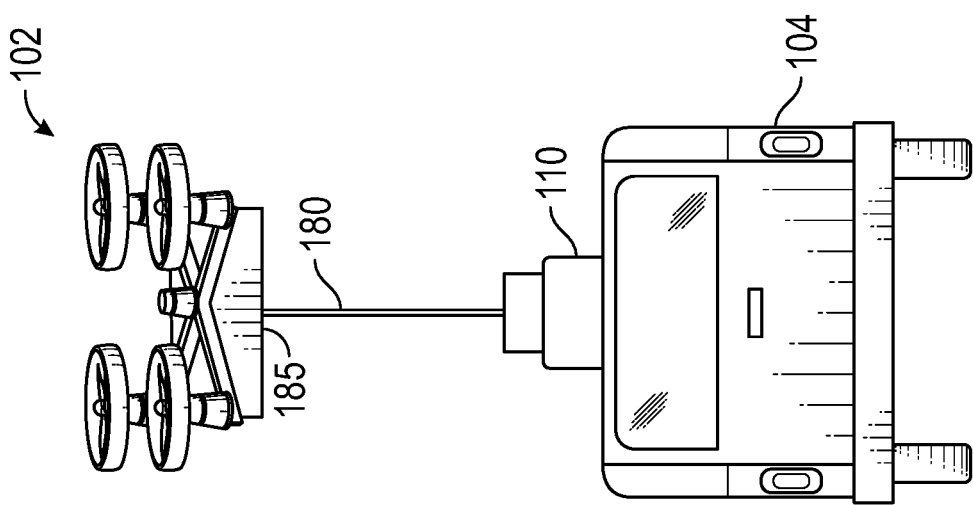
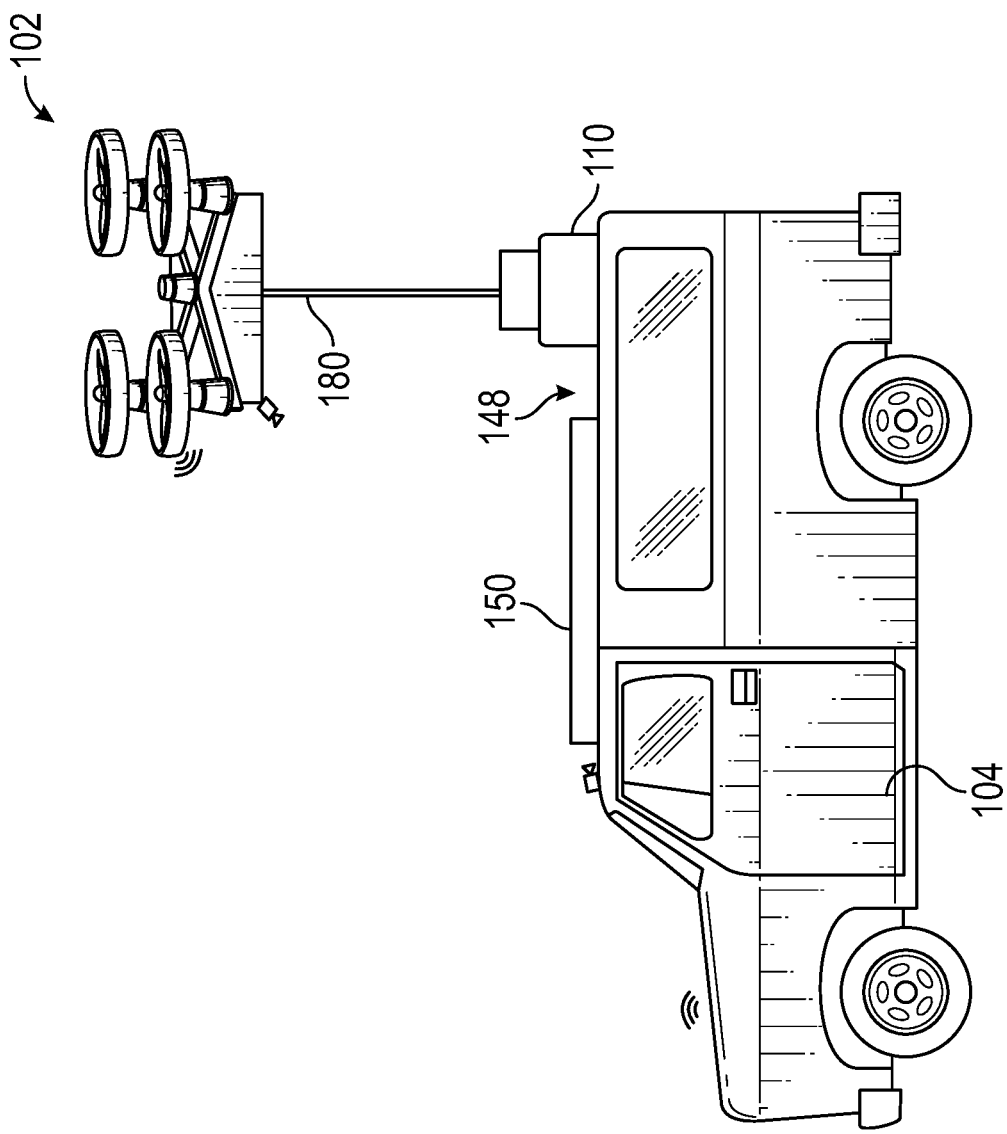

SYSTEMS AND METHODS FOR DELIVERING A PACKAGE FROM A DRONE TO A VEHICLE

FIELD OF THE DISCLOSURE

The disclosure generally relates to the delivery of packages by drones, and more particularly relates to systems and methods for delivering a package from a drone to a vehicle.

BACKGROUND

Companies are expressing interest in utilizing fleets of drones to deliver packages to consumers at a business or residence. In some instances, drones may be problematic for delivery to customers. For example, a drone that is powered by a rotor or an impeller may be dangerous to customers, pets, overhead power lines, ceiling fans, or other features. Furthermore, the drone may not recognize a safe place to deliver a package, or it may be illegal for drones to fly or land in certain areas. Thus, conventional aerial delivery device methods do not allow for safe, secure delivery of packages to delivery locations.

Another problem with package delivery is truck delivery efficiency. That is, it is inefficient for delivery trucks to return to a warehouse to be loaded with additional packages to deliver. Therefore, there is a need to improve the efficiency in truck delivery using drones to increase the route capacity of a delivery truck. Some or all of the above needs and/or problems may be addressed by certain embodiments disclosed herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 5 depicts a system for delivering a package from a drone to a vehicle in accordance with one or more embodiments of the disclosure.

FIG. 7A depicts a top view of system for delivering a package from a drone to a vehicle in accordance with one or more embodiments of the disclosure.

FIG. 7B depicts a front view of system for delivering a package from a drone to a vehicle in accordance with one or more embodiments of the disclosure.

FIG. 10A depicts a top view of system for delivering a package from a drone to a vehicle in accordance with one or more embodiments of the disclosure.

FIG. 10B depicts a front view of system for delivering a package from a drone to a vehicle in accordance with one or more embodiments of the disclosure.

FIG. 13A depicts a system for delivering a package from a drone to a vehicle in accordance with one or more embodiments of the disclosure.

FIG. 13B depicts a system for delivering a package from a drone to a vehicle in accordance with one or more embodiments of the disclosure.

DETAILED DESCRIPTION

Overview

Figure 1:
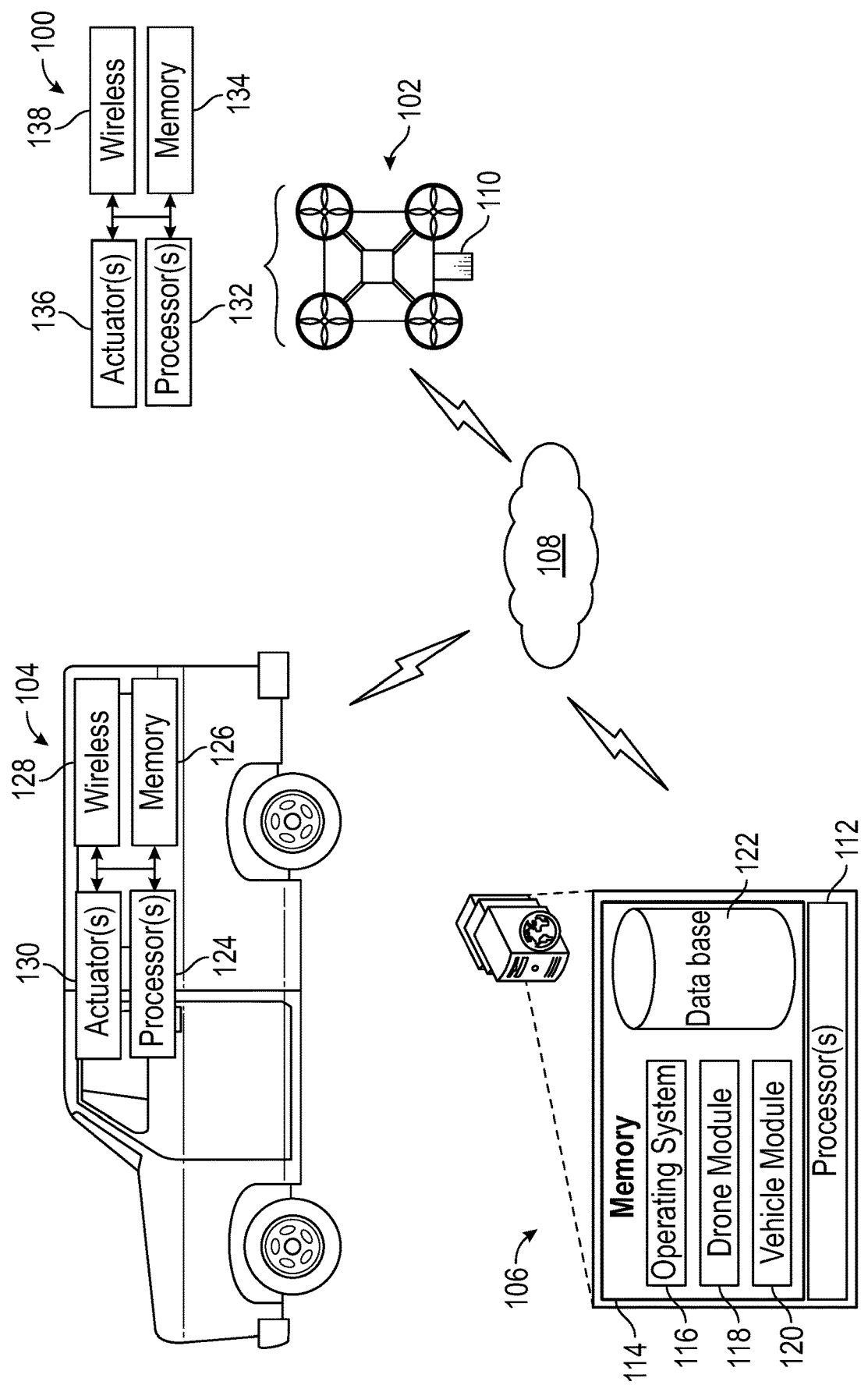
FIG. 1 depicts an illustrative architecture for delivering a package from a drone to a vehicle in accordance with one or more embodiments of the disclosure.

The disclosure is related to systems and methods for delivering a package from a drone to a vehicle. The delivery of the package from the drone to the vehicle can occur while the vehicle is in route, which may improve the efficiency of the route, minimize the number of return trips by the vehicle to a depot for picking up packages for delivery, and minimize the number of vehicles needed to deliver packages along the route.

In some instances, the vehicle may be moving. In other instances, the vehicle may be stopped. In certain embodiments, the vehicle may be an autonomous vehicle. In other instances, the vehicle may be manually driven by a driver. In other instances, the vehicle may be remotely driven. Similarly, in some instances, the drone may be moving. In other instances, the drone may be stopped (e.g., hovering in place). In certain embodiments, the drone may be autonomous. In other instances, the drone may be remotely controlled.

In certain embodiments, the drone may identify the vehicle using a sensor (e.g., a camera) of a drone computer vision system configured to detect a machine-readable optical element disposed on the vehicle. In some instances, the machine-readable optical element may be a bar code, a QR code, or the like. Similarly, the vehicle may identify the drone using a similar method. For example, the vehicle may include a sensor (e.g., a camera) of a vehicle computer vision system configured to detect a machine-readable optical element disposed on the drone.

Once the drone has detected the vehicle (and/or the vehicle has detected the drone), the vehicle and the drone may establish a wireless communication connection therebetween using, for example, vehicle-to-vehicle communications, vehicle-to-infrastructure (V2X) communications, dedicated short range communications (DSRC), Bluetooth, near-field communication (NFC), cellular commutations (e.g., 5G or the like), satellite, radio, Wi-Fi or Wi-Fi direct, or over a wireless network. In this manner, the vehicle and the drone may be synced together. That is, the vehicle may communicate to the drone the position, movement, speed, and/or acceleration (or deceleration) of the vehicle. The vehicle may also communicate to the drone any anticipated movement or acceleration (or deceleration) of the vehicle. In this manner, the drone may use the information provided by the vehicle to maintain and predict a relative positon of the drone to the vehicle.

More so, the drone computer vision system may monitor and/or predict the position, movement, speed, and/or acceleration (or deceleration) of the vehicle in order to maneuver the drone adjacent to the vehicle. Other sensor systems may be used by the drone to monitor and predict the movement of the vehicle, including radar, LIDAR, or the like. Similarly, the vehicle computer vision system may monitor and/or predict the position, movement, speed, and/or acceleration (or deceleration) of the drone in order to facilitate the maneuvering of the drone adjacent to the vehicle. Other sensor systems may be used by the vehicle to monitor and predict the movement of the drone, including radar, LIDAR, or the like. The data from the sensors on the drone and/or the vehicle may be used by the drone controller and/or the engine control unit (ECU) of the vehicle to maneuver the vehicle and/or drone relative to each other.

In some instances, once the vehicle and drone have established a wireless communication connection, and the drone has indicated to the vehicle that it would like to deliver a package to the vehicle, the vehicle may then enter a drone package delivery driving mode. In some instances, the drone delivery driving mode may be an autonomous driving mode that is more conducive to the delivery of a package to the vehicle from a drone. For example, the speed of the vehicle may be decreased (or increased), the acceleration of the vehicle may be decreased (or increased), and/or the vehicle may make few turns, if any. Such driving conditions may make transfer of the package from the drone to the vehicle easier. After the drone delivers the package to the vehicle, the vehicle may return to its previous driving mode.

The vehicle may include an opening and an access door disposed about the opening. The access door may be opened and closed to provide access to or close off the opening in the vehicle. In some instances, the access door and the opening may be disposed on the roof of the vehicle. The access door and opening may be disposed at any location on the vehicle. In some instances, the access door and opening may collectively be a "moonroof" or the like. In any case, the opening may provide access to the interior of the vehicle (e.g., a storage area within the vehicle). In this manner, the access door may be opened and closed to provide access to the opening in the vehicle.

The vehicle may include package catching system comprising a net configured to receive the package from the drone. The net may be any suitable device capable of receiving a package dropped from a drone. For example, the net may be a cloth, bag, mess, hopper, or the like. The net may be any device capable of catching the package. The net may be disposed within the vehicle below the opening. In some instances, the net may be in mechanical communication with a rail system. For example, the net may be raised and lowered by one or more actuators between an elevated position and a lowered position along the rail system. In some instances, in the elevated position, the net may be disposed near the opening in the vehicle. In other instances, in the lowered position, the net may be disposed near the floor of the vehicle. The elevated and lowered positions of the net are relative and may correspond to any position within the vehicle.

In certain embodiments, the drone may release the package through the opening in the vehicle and into the net. In such instances, the net may be in the elevated position. For example, when the drone signals to the vehicle that it is going to deliver a package to the vehicle, the access door may be opened and the net may be raised to the elevated position. The drone may then deliver the package through the opening in the vehicle and into the net.

In order to determine if the package is located within the net, one or more net sensors (e.g., weight sensors) may be in mechanical communication with the net. In this manner, the weight of the package within the net may be detected by the weight sensors, which may indicate that the package is disposed on the net. Other types of sensors may be used to detect the presence of the package on the net. For example, optical sensors, pressure sensors, lasers, or the like may be used to detect the presence of the package on the net. Once the package is dropped into the net and detected thereon, the net may be lowered to the lowered position and the access door may be closed, thereby closing off the opening to the interior of the vehicle. The package may then be removed from the net. This process may be repeated indefinitely.

The package catching system may include a number of position sensors configured to determine if the package is in the correct position to be dropped into the net from the drone. For example, the rail system may include a number of position sensors (e.g., infrared sensors) disposed above the net. In some instances, the infrared sensors may detect if a package breaks a plane located above the net. For example, a first position sensor may sense that the package has broken a first plane above the net. A second position sensor may be disposed below the first position sensor. The second position sensor may sense that the package has broken a second plane above the net and below the first plane. This may indicate that the package is being lowered by the drone into the net.

Next, the first position sensor may no longer detect the presence of the package after it has been lowered completely below the first plane. Similarly, if the package is lowered further, the second position sensor may no longer detect the presence of the package after it has been lowered completely below the second plane. This may indicate that the package is in the correct position to be released into the net.

As noted above, the drone may be configured to release the package through the opening in the vehicle and into the net. To do this, the drone may position itself about the opening in the vehicle. For example, the drone may monitor the position of the vehicle, the vehicle may monitor the position of the drone, and/or the vehicle and drone may establish a wireless communication connection therebetween, which may enable the drone to sync with the vehicle such that the drone is capable of monitoring, tracking, and/or predicting the movement of the vehicle.

Once the drone is positioned adjacent to the opening in the vehicle, the package may be lowered from the drone into the opening in the vehicle and onto the net. For example, the package may be releasably attached to a retractable cable extending from the drone. The retractable cable may be extended from the drone so as to lower the package into the opening in the vehicle and onto the net. That is, the package may be extended via the retractable cable through the opening in the vehicle and positioned about the net. For example, once the package is determined to be in the correct position above the net, as determined by the position sensors of the package catching system, the package may be released from the retractable cable and fall into the net. The retractable cable may then be retracted back into the drone.

In some instances, the retractable cable may include an attachment device disposed at a distal end of the retractable cable. The attachment device may be releasably attached to the package. In certain embodiments, the attachment device at the end of the retractable cable may communicate with the drone via wireless communication or cable communication embedded in the retractable cable. The attachment device may include one or more sensors configured to determine the speed and position of the attachment device. This information may be communicated to the drone so that the drone can make speed and position adjustments based on the speed and position of the attachment device. This may be usefull due to wind and other external factors that can modify the position of the package with respect to the drone position.

In some instances, the attachment device comprises an electromagnetic attachment device disposed at a distal end of the retractable cable. The electromagnetic attachment device may include an electromagnet therein. The electromagnet may be energized to create a suitable electromagnetic field capable of magnetically attaching the electromagnetic attachment device to a magnetic element disposed on the package. In this manner, the package may be releasably attached to the electromagnetic attachment device via the energizing and de-energizing of the electromagnet. In certain embodiments, the electromagnetic attachment device may have a capacity to hold more than 60 Kg. About 90% of the online retailer deliveries are 2 Kg or less. The electromagnetic attachment device may have any suitable capacity. The electromagnetic attachment device may be activated or deactivated via wireless communication or via wired communication embedded in the retractable cable. Any releasable attachment device between the drone and the package may be used. For example, the package may be attached to the drone by way of a releasable hook, fastener, screw, or the like.

The package may include a magnetic element. In some instances, the magnetic element may be a permanent magnet disposed on a shell of the package. For example, the package may comprise an air transport box that transports a payload therein. In some instances, the package may include a metallic area on a top side thereof that allows the electromagnetic attachment device to hold the package when the electromagnet is energized. In one example embodiment, the contents of the package may be magnetic. For example, an item being delivered in the package by the drone may be wholly or partially magnetic. In another example embodiment, the packaging within the package may be wholly or partially magnetic. For example, at least some of the packaging used to wrap or protect the item being delivered by the done may comprise a ferromagnetic material. In another example embodiment, a magnetic material may be imbedded into the package. For example, a ferromagnetic material may be imbedded (e.g., woven, injected, formed, etc.) into the walls of the package. In some instances, a magnetic wire mesh may be incorporated into the walls of the package. In another example embodiment, a ferromagnetic material may be placed inside the package. For example, a magnetic sheet (e.g., ferrous foil or the like) may be placed inside the package. In another example embodiment, the magnetic element may be an electromagnet. For example, the package may include a power supply (e.g., a battery and/or a solar cell) capable of creating an electric current through a wire coil, which in turn may create a suitable magnetic field about the package. Any material, object, or device that possesses or is capable of creating a suitable magnetic field about the package may be used herein in combination with or form part of the package.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Turning now to the drawings, FIG. 1 depicts an illustrative architecture 100 in which techniques for providing the systems and methods disclosed herein may be implemented. The illustrative architecture 100 may include a drone 102, a vehicle 104, and one or more package delivery system computers 106. All of the various components may interact with one another directly and/or over one or more networks 108. For example, in some instances, all of the various components may access, receive from, transmit to, control, or otherwise interact with one another directly and/or over the networks 108 to facilitate the delivery of a package 110 from the drone 102 to the vehicle 104.

The networks 108 may include any one or a combination of multiple different types of networks, such as cable networks, the Internet, wireless networks, and other private and/or public networks. In some instances, the networks 108 may include vehicle-to-vehicle communications, vehicle-to-infrastructure (V2X) communications, dedicated short range communications (DSRC), Bluetooth, near-field communication (NFC), cellular commutations (e.g., 5G or the like), satellite, radio, Wi-Fi or Wi-Fi direct, or over a wireless network.

The package delivery system computers 106 may be any type of computing devices such as, but not limited to, mobile, desktop, and/or cloud computing devices, such as servers. The package delivery system computers 106 may include one or more servers, perhaps arranged in a cluster, as a server farm, or as individual servers not associated with one another. Other server architectures may also be used to host the package delivery system computers 106. The package delivery system computers 106 may be equipped with one or more processors 112 and a memory 114, which may include an operating system 116 and one or more application programs or services for implementing the features disclosed herein including a drone module 118, a vehicle module 120, and/or a database 122. In some instances, the drone module may communicate with and/or control the drone 102. Similarly, in some instances, the vehicle module 120 may be in communication with and/or control the vehicle 104.

The vehicle 104 may include a computing device (e.g., an ECU, a controller, or the like) equipped with one or more processors 124 and a memory 126. The vehicle 104 also may include one or more actuators 130 for actuating the various mechanical systems of the vehicle 104 disclosed herein and a wireless communication transceiver 128 or the like for communicating with the package delivery system computers 106 and/or the drone 102, all of which may be in communication with the processors 124 and the memory 126.

The drone 102 may include a computing device (e.g., a controller or the like) equipped with one or more processors 132 and a memory 134. The drone 102 also may include one or more actuators 136 for actuating the various mechanical systems of the drone 102 disclosed herein and a wireless communication transceiver 138 or the like for communicating with the package delivery system computers 106 and/or the vehicle 104, all of which may be in communication with the processors 132 and the memory 134. In some instances, the drone 102 may communicate directly with the vehicle 104 using vehicle-to-vehicle communications, vehicle-to-infrastructure (V2X) communications, dedicated short range communications (DSRC), Bluetooth, near-field communication (NFC), cellular commutations (e.g., 5G or the like), satellite, radio, Wi-Fi or Wi-Fi direct, or over a wireless network.

Figure 2:
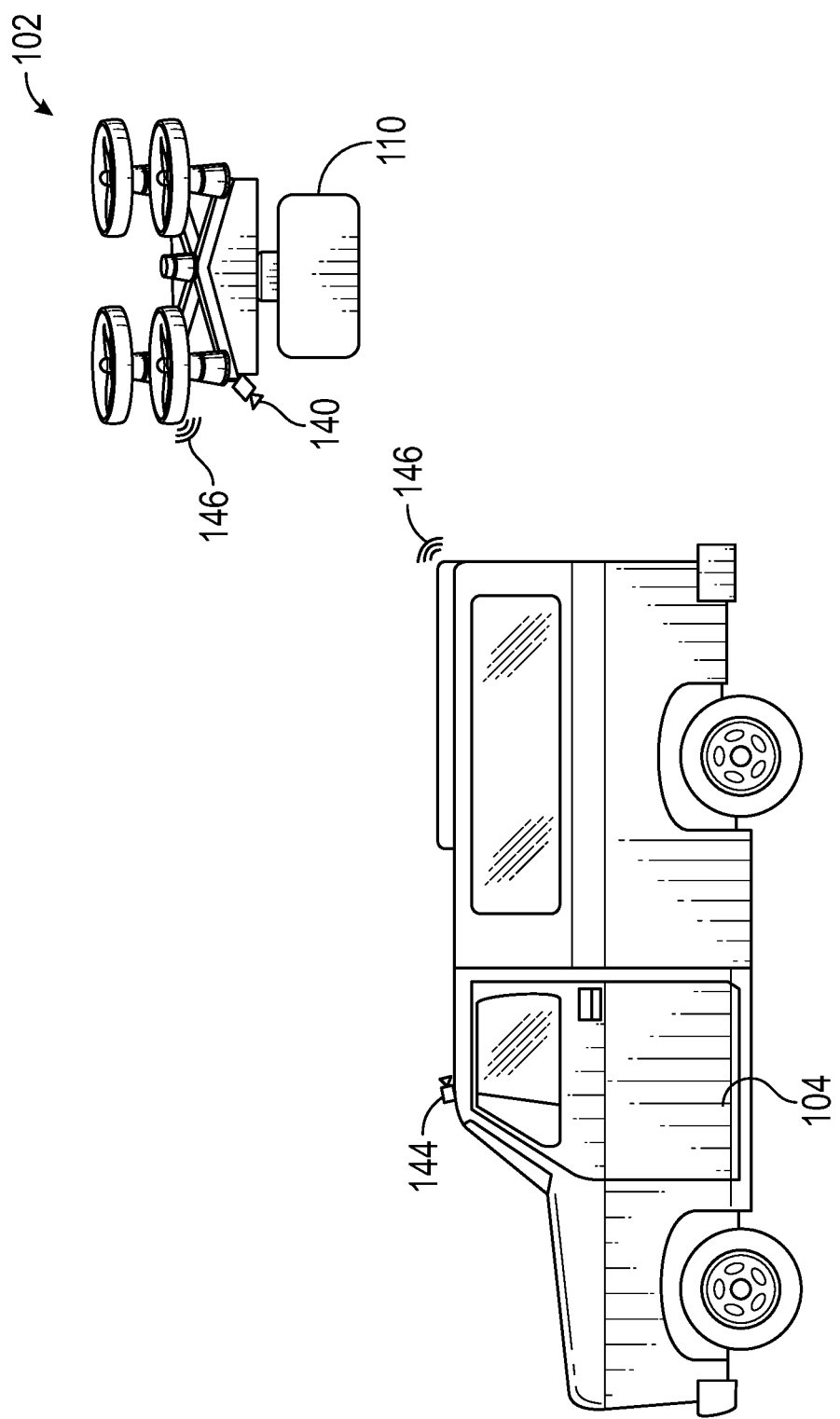
FIG. 2 depicts a system for delivering a package from a drone to a vehicle in accordance with one or more embodiments of the disclosure.
Figure 4:
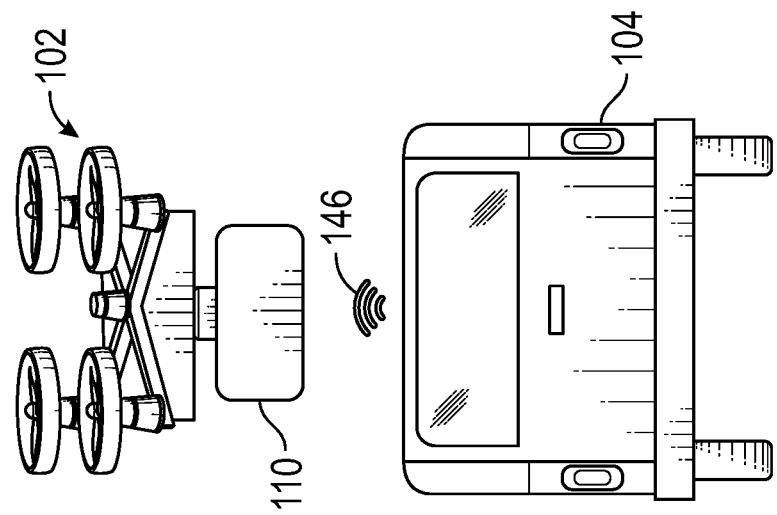
FIG. 4 depicts a system for delivering a package from a drone to a vehicle in accordance with one or more embodiments of the disclosure.
Figure 3:
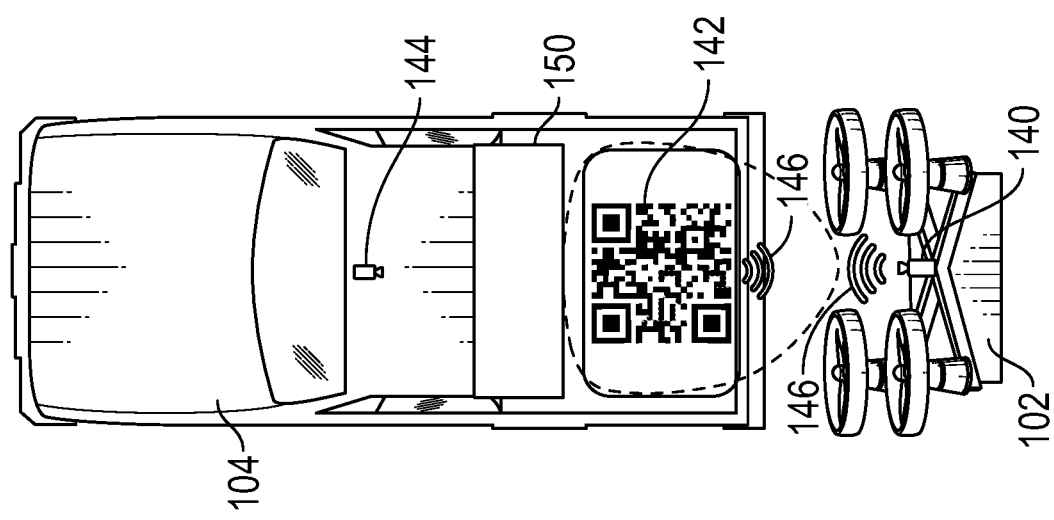
FIG. 3 depicts a system for delivering a package from a drone to a vehicle in accordance with one or more embodiments of the disclosure.

As depicted in FIGS. 2-4, the drone 102 may identify the vehicle 104 using a sensor (e.g., a camera 140) configured to detect a machine-readable optical element 142 disposed on the vehicle 104. Similarly, the vehicle 104 may identify the drone 102 using a similar method. For example, the vehicle 104 may include a sensor (e.g., a camera 144) configured to detect a machine-readable optical element disposed on the drone 102. Once the drone 102 has detected the vehicle 104, the vehicle 104 and the drone 102 may establish a wireless communication connection 146 therebetween.

Figure 6B:
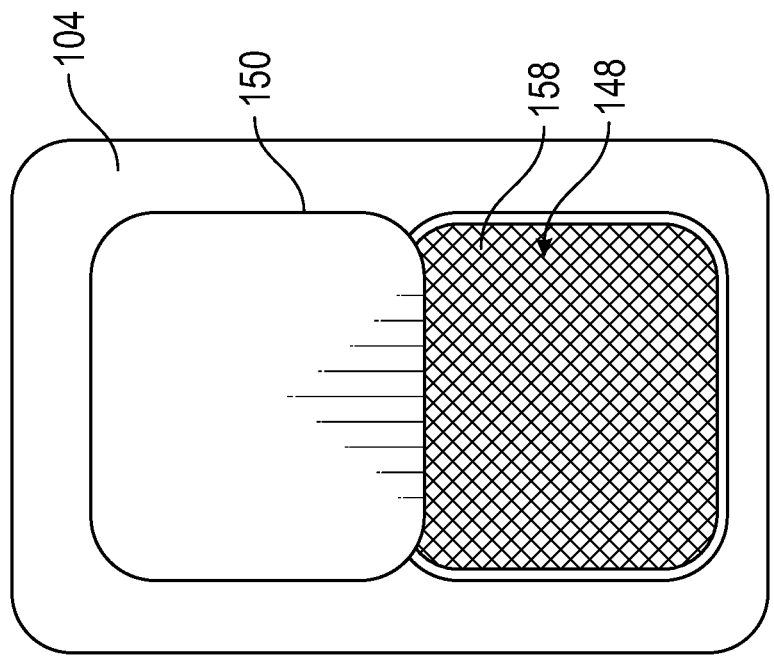
FIG. 6B depicts a top view of system for delivering a package from a drone to a vehicle in accordance with one or more embodiments of the disclosure.
Figure 6A:
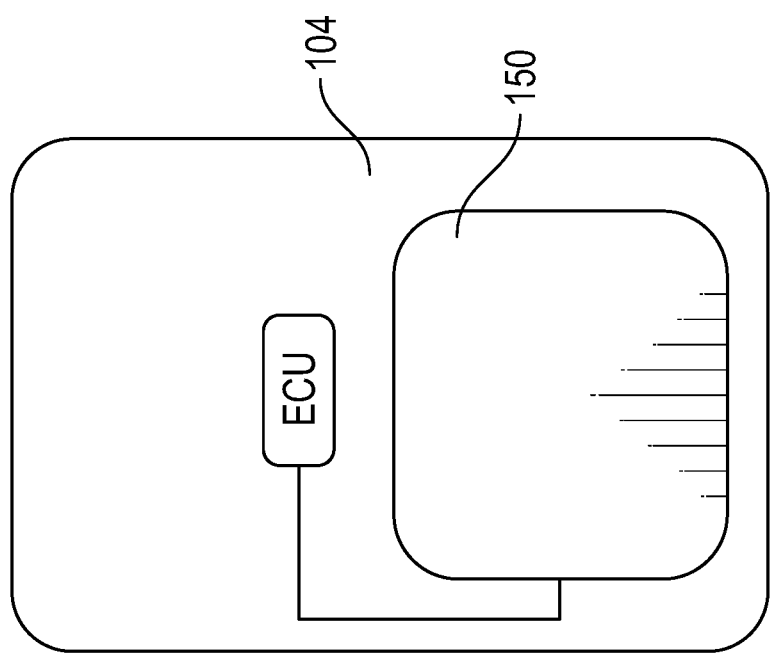
FIG. 6A depicts a top view of system for delivering a package from a drone to a vehicle in accordance with one or more embodiments of the disclosure.

As depicted in FIG. 5, the vehicle 104 may include an opening 148 and an access door 150 disposed about the opening 148. The access door 150 may be opened and closed (as indicated by arrows 152) to provide access to or close off the opening 148 in the vehicle 104. In some instances, the access door 150 and the opening 148 may be disposed on the roof 154 of the vehicle 104. The opening 148 may provide access to the interior of the vehicle 104. In this manner, as depicted in FIGS. 6A and 6B, the access door 150 may be opened and closed to provide access to the opening 148 in the vehicle 104. The access door 150 may be in communication with a computing device (e.g., the ECU) of the vehicle 104.

Figure 12B:
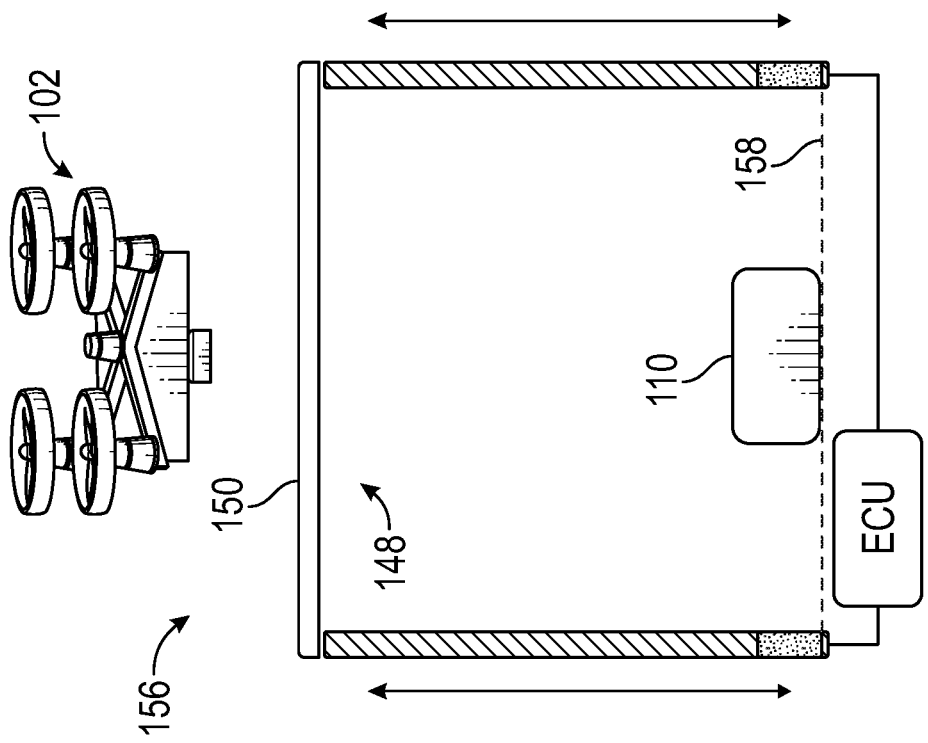
FIG. 12B depicts a front view of system for delivering a package from a drone to a vehicle in accordance with one or more embodiments of the disclosure.

As depicted in FIGS. 7A and 7B, the vehicle 104 may include package catching system 156. The package catching system 156 may include a net 158 configured to receive the package 110 from the drone 102. The net 158 may be disposed within the vehicle 104 below the opening 148. In some instances, the net 158 may be in mechanical communication with a rail system 160. For example, the net 158 may be raised and lowered (as indicated by arrow 164) by one or more actuators 162 disposed on four posts of the rail system 160 between an elevated position (as depicted in FIG. 7B) and a lowered position (as depicted in FIG. 12B). In some instances, in the elevated position, the net 158 may be disposed near the opening 148 in the vehicle 104. In other instances, in the lowered position, the net 158 may be disposed near the floor of the vehicle 104. The rails system 160 and the actuators 162 may be in communication with a computing device (e.g., the ECU) of the vehicle 104.

As depicted in FIGS. 8A-11B, the drone 102 may release the package 110 through the opening 148 in the vehicle and into the net 158. In such instances, the net 158 may be in the elevated position. For example, when the drone 102 signals to the vehicle 104 that it is going to deliver the package 110 to the vehicle 104, the access door 150 may be opened and the net 158 may be raised to the elevated position. The drone 102 may then deliver the package 110 through the opening 148 in the vehicle 104 and into the net 158.

The package catching system 156 may include a number of position sensors 166 configured to determine if the package 110 is in the correct position to be dropped into the net 158 from the drone 102. For example, the rail system 160 may include a number of position sensors 166 (e.g., infrared sensors) disposed above the net 158. The position sensors 166 may detect if the package 110 breaks one or more planes located above the net 158. The position sensors 166 may be in communication with a computing device (e.g., the ECU) of the vehicle 104.

Figure 8B:
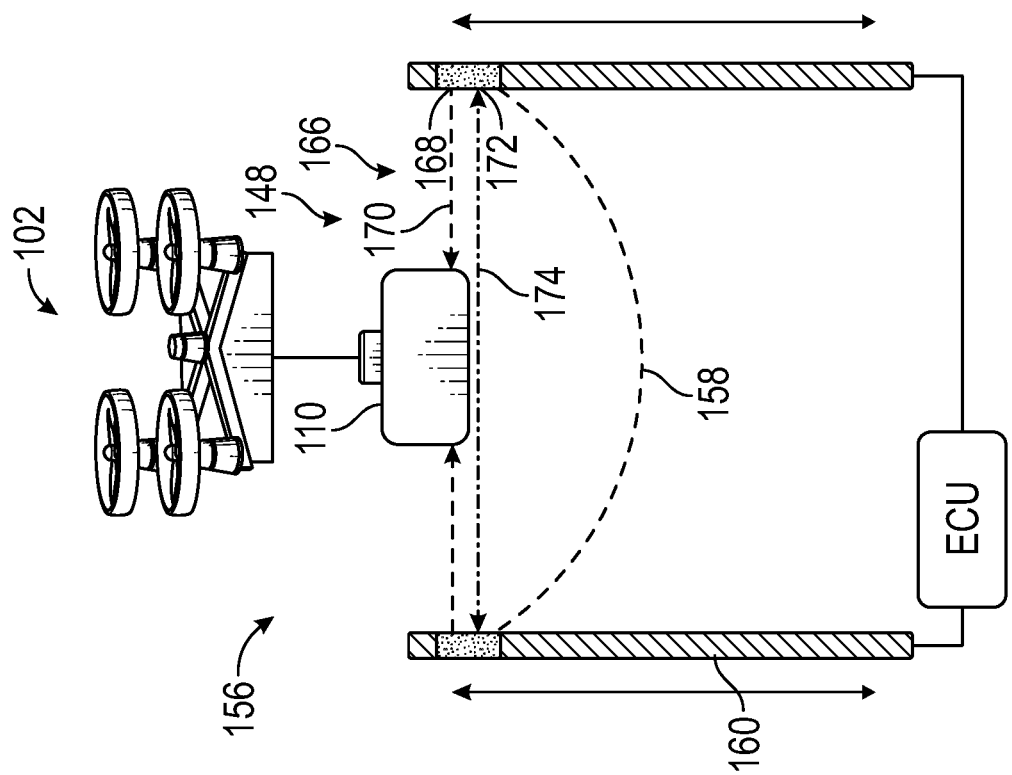
FIG. 8B depicts a front view of system for delivering a package from a drone to a vehicle in accordance with one or more embodiments of the disclosure.
Figure 8A:
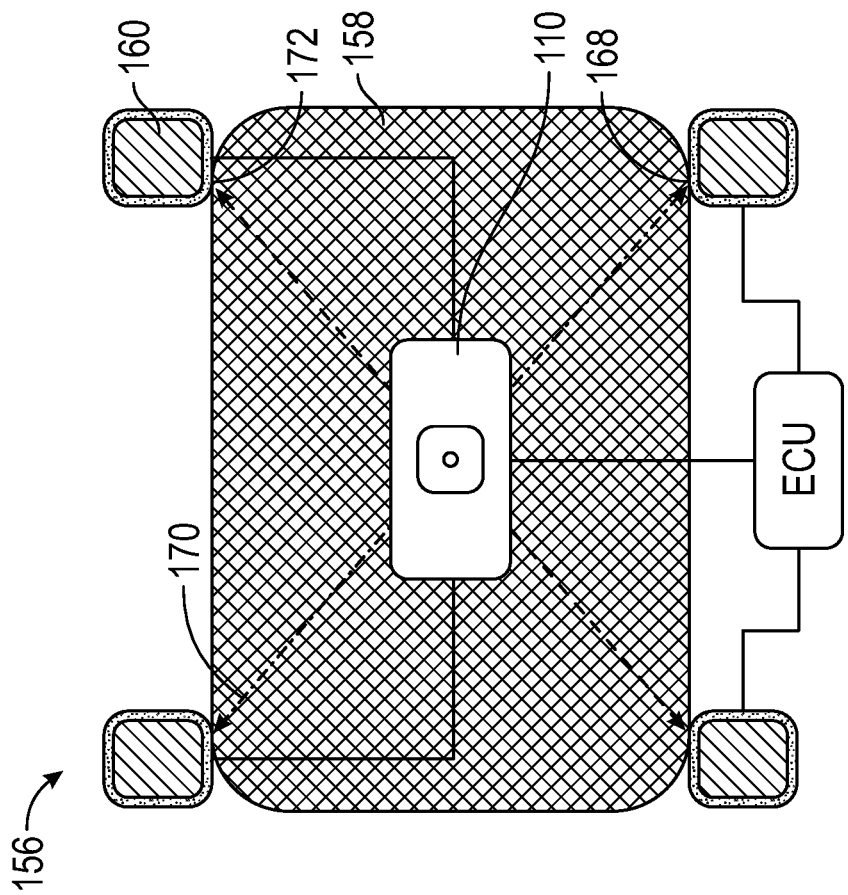
FIG. 8A depicts a top view of system for delivering a package from a drone to a vehicle in accordance with one or more embodiments of the disclosure.
Figure 9B:
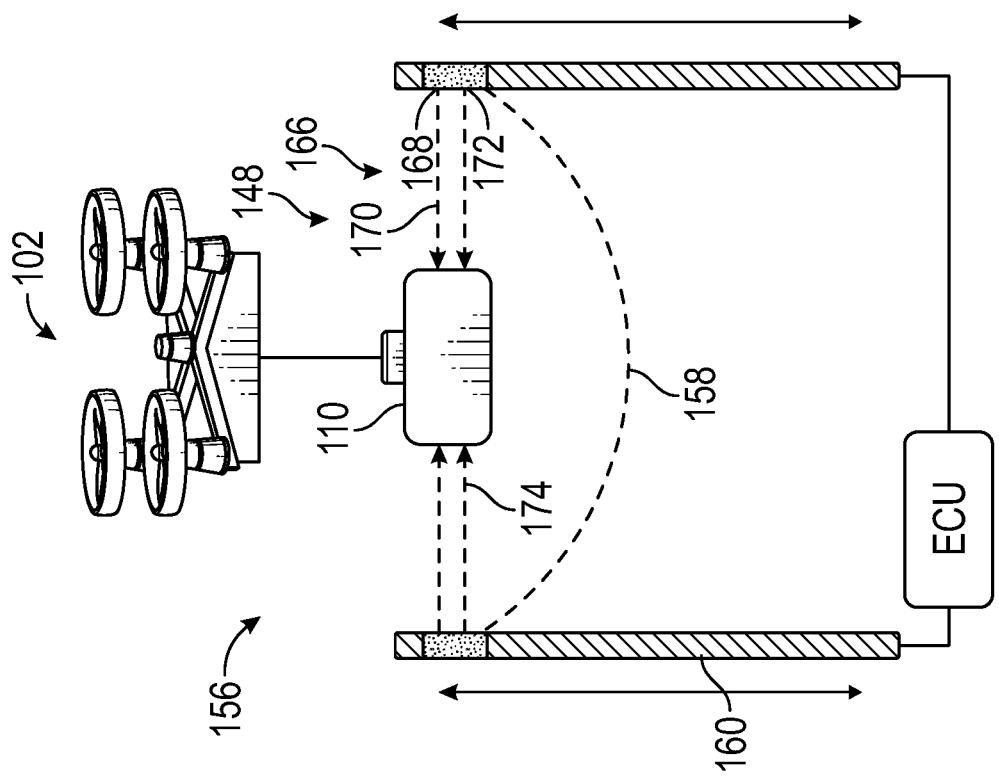
FIG. 9B depicts a front view of system for delivering a package from a drone to a vehicle in accordance with one or more embodiments of the disclosure.
Figure 9A:
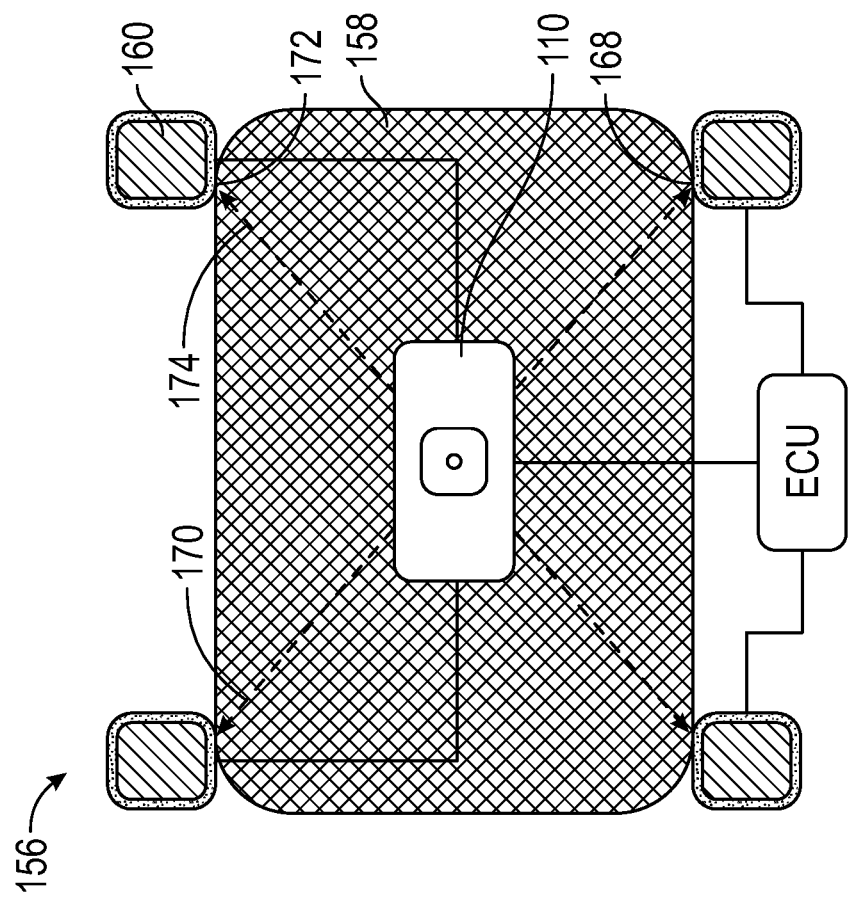
FIG. 9A depicts a top view of system for delivering a package from a drone to a vehicle in accordance with one or more embodiments of the disclosure.

For example, as depicted in FIGS. 8A and 8B, a first position sensor 168 may sense that the package 110 has broken a first plane 170 above the net 158. A second position sensor 172 may be disposed below the first position sensor 168. As depicted in FIGS. 9A and 9B, the second position sensor 172 may sense that the package 110 has broken a second plane 174 above the net 158 and below the first plane 170. This may indicate that the package 110 is being lowered by the drone 102 through the opening 148 and into the net 158. In some instances, the first position sensor 168 and the second position sensor 172 may be disposed in opposite corners of the rail system 160. In this manner, the first plane 170 and the second plane 174 may crisscross each other.

As the drone 102 continues to lower the package 110 into the net 158, as depicted in FIGS. 10A and 10B, the first position sensor 168 may no longer detect the presence of the package 110 after it has been lowered completely below the first plane 170. Similarly, if the package 110 is lowered further, the second position sensor 172 may no longer detect the presence of the package 110 after it has been lowered completely below the second plane 174. This may indicate that the package 110 is in the correct position to be released by the drone 102 into the net 158.

Figure 11B:
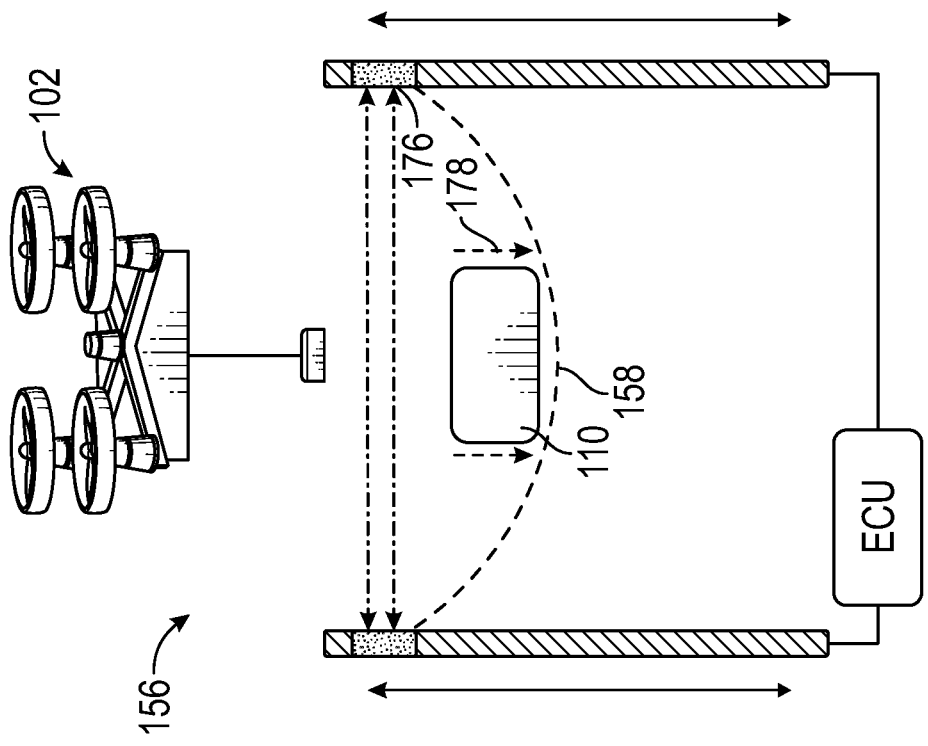
FIG. 11B depicts a front view of system for delivering a package from a drone to a vehicle in accordance with one or more embodiments of the disclosure.
Figure 11A:
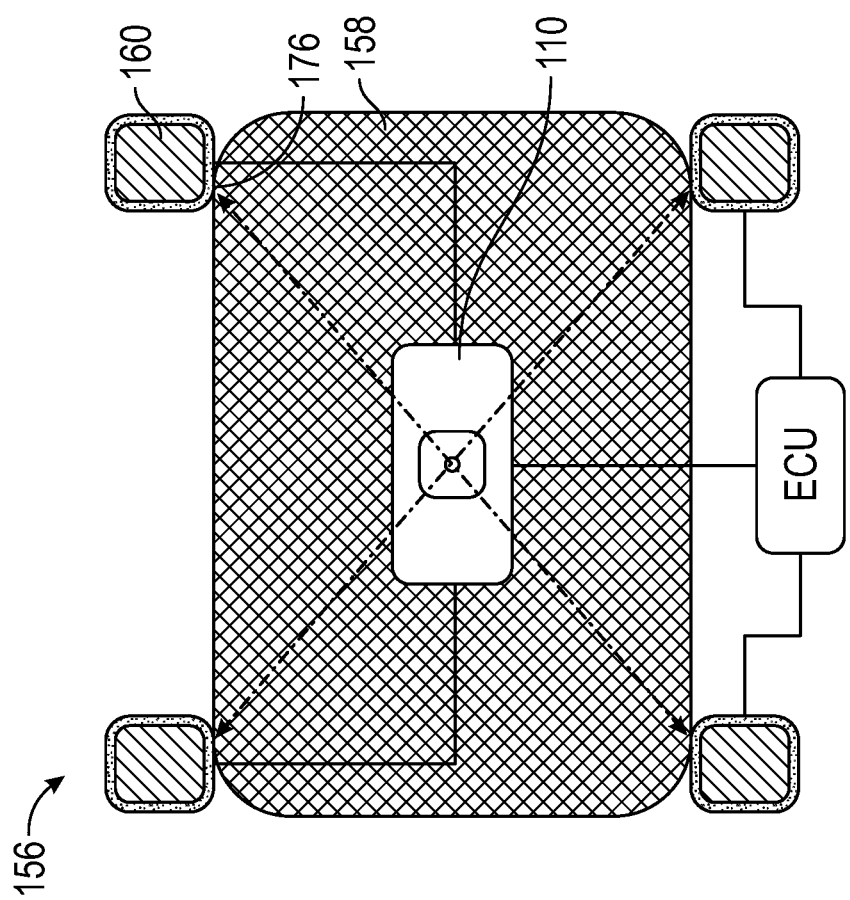
FIG. 11A depicts a top view of system for delivering a package from a drone to a vehicle in accordance with one or more embodiments of the disclosure.

As depicted in FIGS. 11A and 11B, in order to determine if the package 110 is located within the net 158, one or more net sensors 176 (e.g., weight sensors) may be in mechanical communication with the net 158. The net sensors 176 may be in communication with a controller (e.g., the ECU) of the vehicle 104. In this manner, the weight of the package 110 within the net 158 (as indicated by arrows 178) may be detected by the net sensors 176, which may indicate that the package 110 is disposed on the net 158.

Figure 12A:
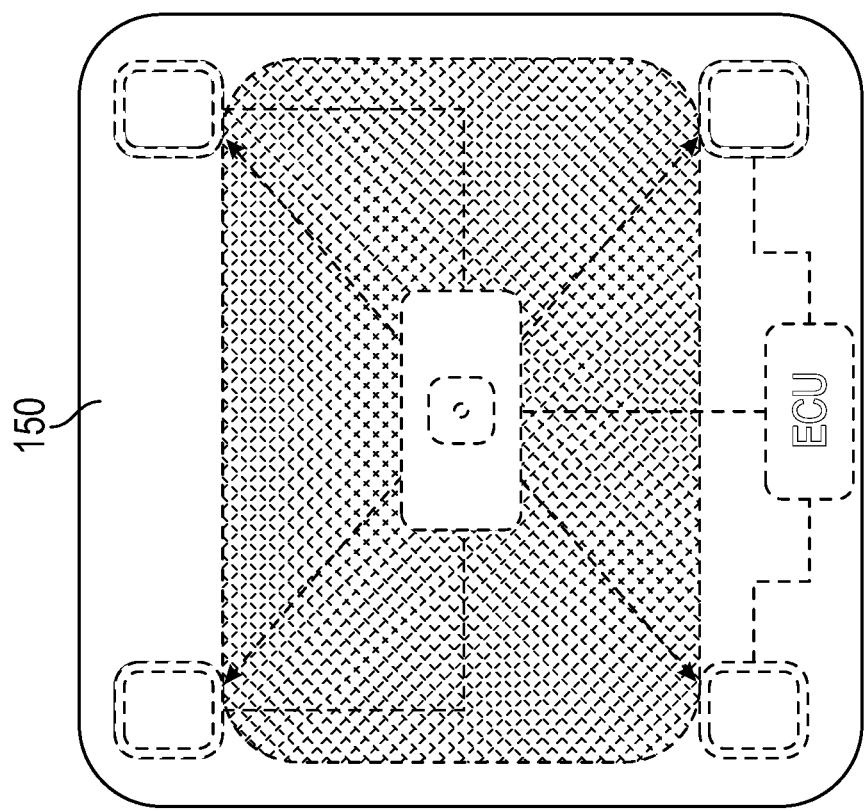
FIG. 12A depicts a top view of system for delivering a package from a drone to a vehicle in accordance with one or more embodiments of the disclosure.

As depicted in FIGS. 12A and 12B, once the package 110 is dropped into the net 158 and detected thereon by the net sensors 176, the net 158 may be lowered to the lowered position and the access door 150 may be closed, thereby closing off the opening 148 to the interior of the vehicle 104. The package 110 may then be removed from the net 158.

Figure 14B:
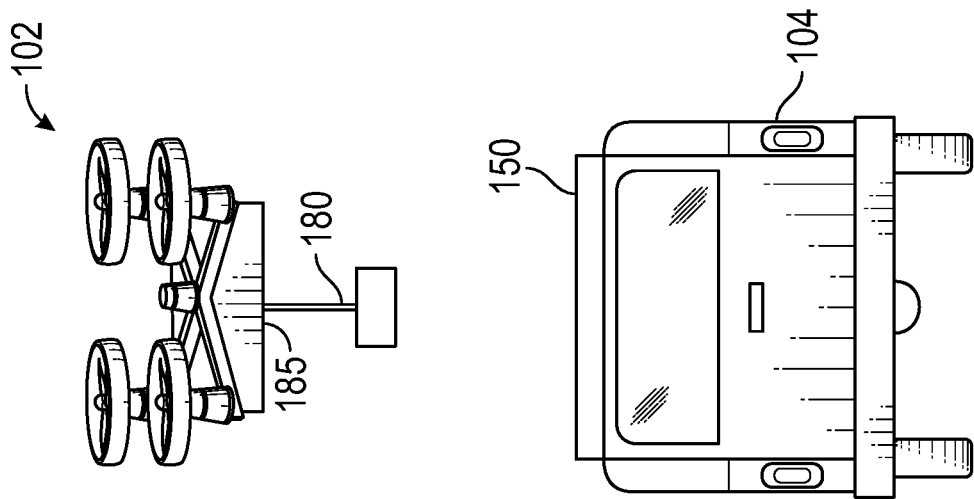
FIG. 14B depicts a system for delivering a package from a drone to a vehicle in accordance with one or more embodiments of the disclosure.
Figure 14A:
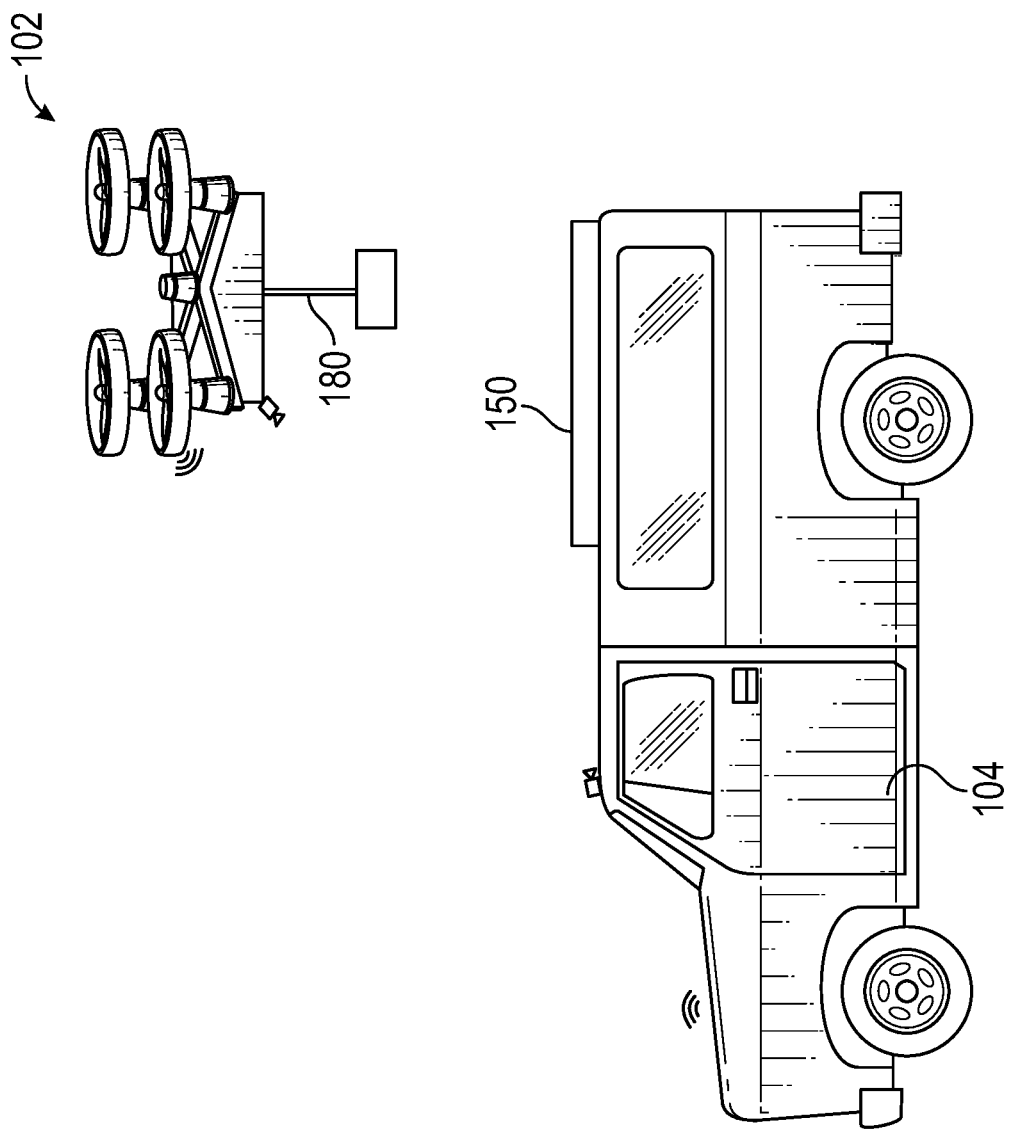
FIG. 14A depicts a system for delivering a package from a drone to a vehicle in accordance with one or more embodiments of the disclosure.

As depicted in FIGS. 13A-14B, the drone 102 may be configured to release the package 110 through the opening 148 in the vehicle 104 and into the net 158. To do this, the drone 102 may position itself about the opening 148 in the vehicle 104. Once the drone 102 is positioned adjacent to (e.g., above) the opening 148 in the vehicle 104, the package 110 may be lowered from the drone 102 into the opening 148 in the vehicle 104 and onto the net 158, as discussed above. For example, the package 110 may be releasably attached to a retractable cable 180 extending from the drone 102. The retractable cable 180 may be extended from the drone 102 so as to lower the package 110 into the opening 148 in the vehicle 104 and onto the net 158. For example, once the package 110 is determined to be in the correct position above the net 158, as determined by the position sensors 166 of the package catching system 156, the package 110 may be released from the retractable cable 180 and fall into the net 158. The retractable cable 180 may then be retracted back into the drone 102, as depicted in FIGS. 14A and 14B.

In some instances, as depicted in FIG. 13B, the retractable cable 180 may be attached to the drone 102 by way of a safety release mechanism 185. The safety release mechanism 185 may release the retractable cable 180 in the event of an emergency. For example, if the retractable cable 180 becomes caught on the vehicle 104 or elsewhere, the safety release mechanism 185 may release the retractable cable 180 from the drone 102.

Figure 15B:
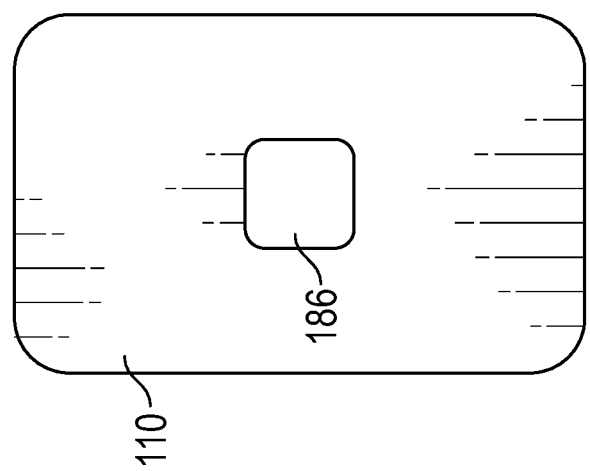
FIG. 15B depicts a top view of package for delivering a package from a drone to a vehicle in accordance with one or more embodiments of the disclosure.
Figure 15A:
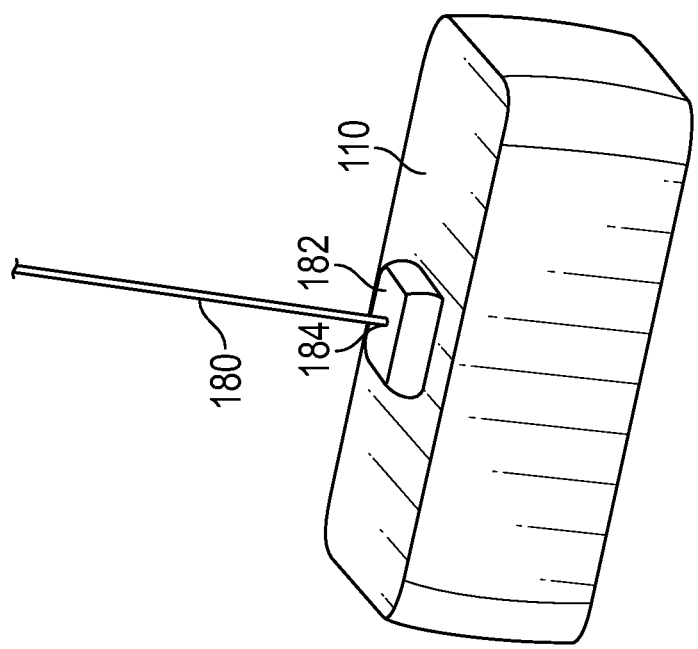
FIG. 15A depicts an attachment device for delivering a package from a drone to a vehicle in accordance with one or more embodiments of the disclosure.

As depicted in FIGS. 15A and 15B, the retractable cable 180 may include an attachment device 182 disposed at a distal end 184 of the retractable cable 180. The attachment device 182 may be releasably attached to the package 110. In some instances, the attachment device 182 comprises an electromagnetic attachment device. The electromagnetic attachment device may include an electromagnet therein. The electromagnet may be energized to create a suitable electromagnetic field capable of magnetically attaching the electromagnetic attachment device to a magnetic element 186 disposed on the package 110.

In certain embodiments, the attachment device 182 may communicate with the drone 102 via wireless communication or cable communication embedded in the retractable cable 180. The attachment device may include one or more sensors configured to determine the speed and position of the attachment device 182. This information may be communicated to the drone 102 so that the drone 102 can make speed and position adjustments based on the speed and position of the attachment device 182.

Illustrative Processes

Figure 16:
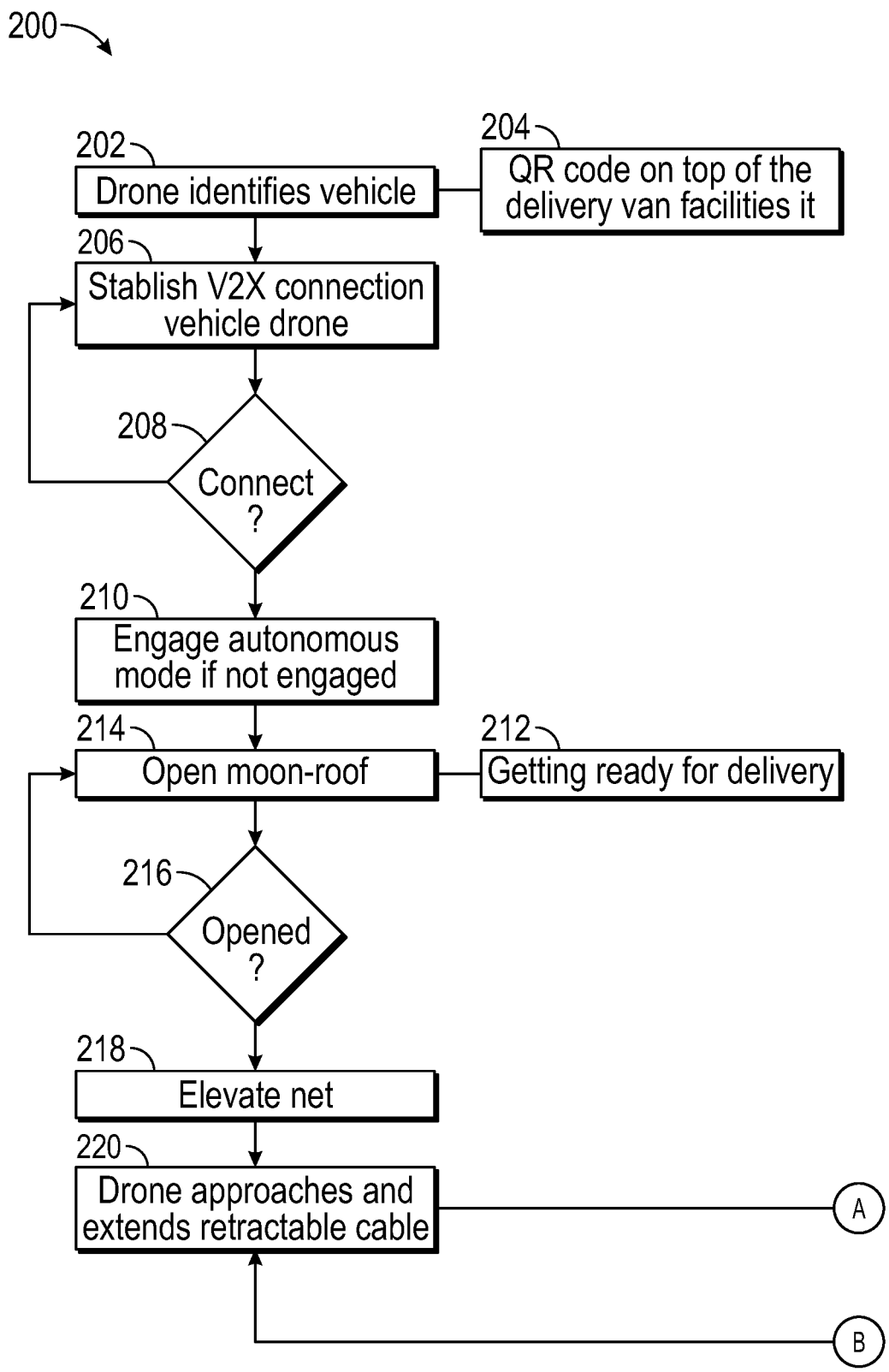
FIG. 16 depicts a flow diagram for delivering a package from a drone to a vehicle in accordance with one or more embodiments of the disclosure.
Figure 16:
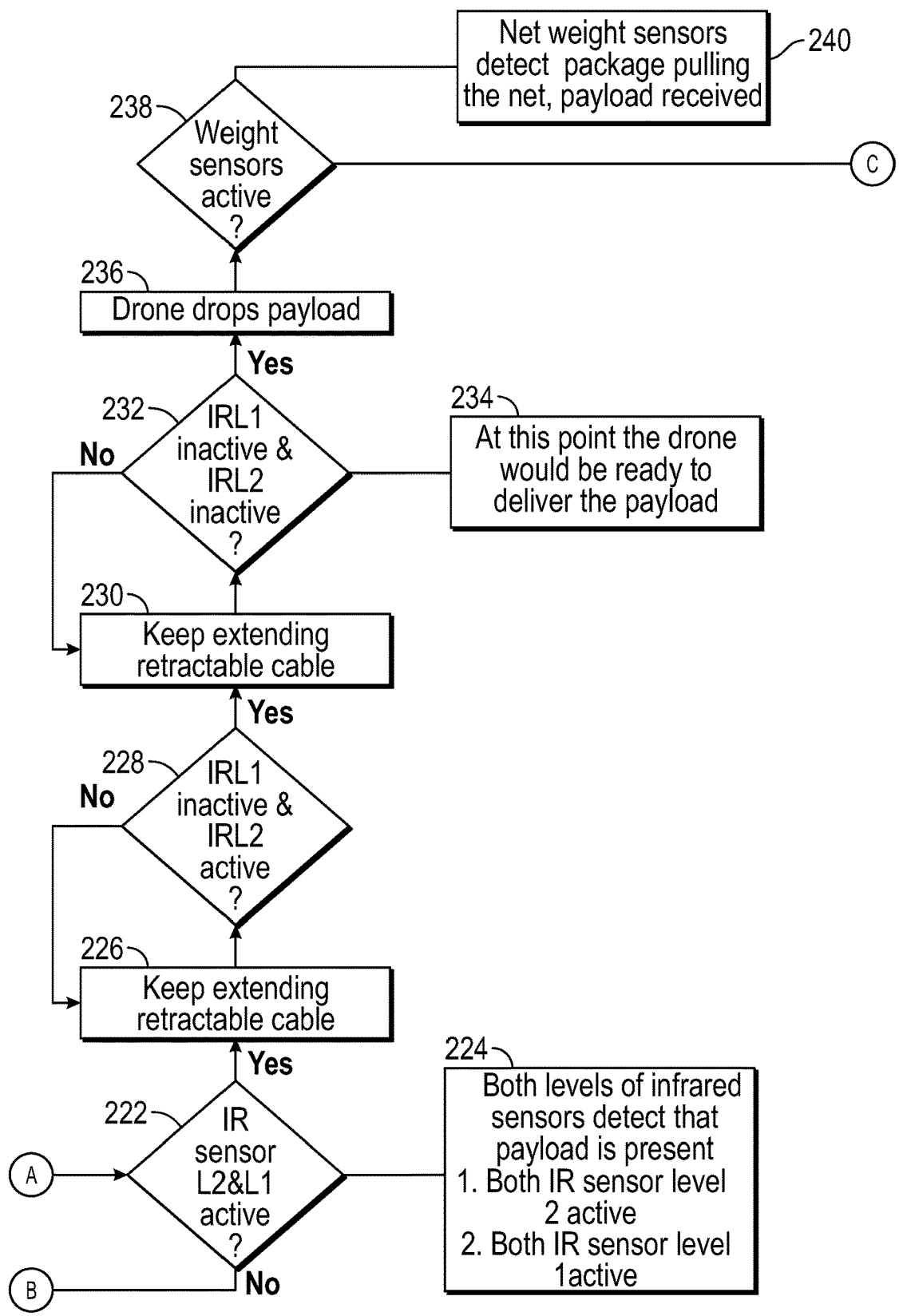
Figure 16:
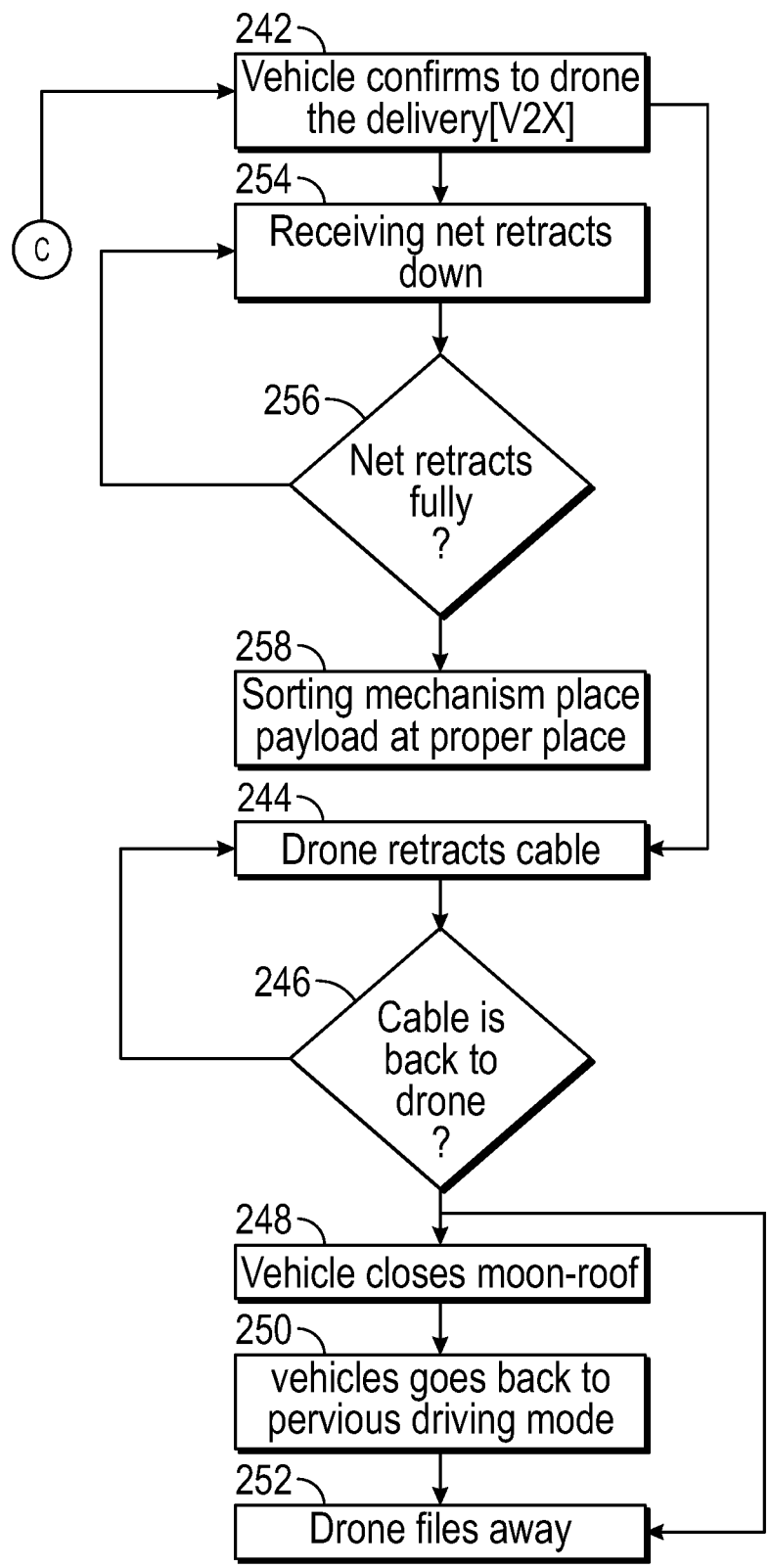

FIG. 16 illustrates an example flow diagram showing a process 200 for delivering a package from a drone to a vehicle, as described above. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The processes may, but need not, be implemented by a computing device operated by the drone 102, the vehicle 104, the package delivery system computers 106, or a combination thereof. In some aspects, the process 200 may begin at block 202 by identifying the vehicle 104 by the drone 102. For example, at block 204, the drone 102 may identify the vehicle 104 using a sensor (e.g., a camera 140) configured to detect a machine-readable optical element 142 disposed on the vehicle 104. Once the drone 102 has identified the vehicle 104, the vehicle 104 and the drone 102 may establish a wireless communication connection 146 therebetween, at blocks 206 and 208.

In some instances, once the vehicle 104 and drone 102 have established a wireless communication connection 146, the vehicle 104 may then enter a drone package delivery driving mode, at block 210. In this manner, at block 212, the vehicle 104 may prepare to receive the package 110 from the drone 102. For example, at blocks 214 and 216, access door 150 may be opened to provide access to the opening 148 in the vehicle 104. At block 218, the net 158 may be raised by the one or more actuators 162. In the elevated position, the net 158 may be disposed near the opening 148 in the vehicle 104.

At block 220, the drone 102 may position itself about the opening 148 in the vehicle 104. Once the drone 102 is positioned adjacent to (e.g., above) the opening 148 in the vehicle 104, the retractable cable 180 may be extended from the drone 102 so as to lower the package 110 into the opening 148 in the vehicle 104 and onto the net 158. At blocks 222 and 224, the first position sensor 168 and the second sensor 172 may sense that the package 110 has broken the first plane 170 and the second plane 174 above the net 158. If not, the process may go back to block 220. If the first position sensor 168 and the second sensor 172 continue to sense that the package 110 has broken the first plane 170 and the second plane 174 above the net 158, then the retractable cable 180 may continue to extend from the drone 102, at block 226. At block 228, if the second sensor 172 continues to sense that the package 110 has broken the second plane 174 above the net 158, then the retractable cable 180 may continue to extend from the drone 102, at block 230. That is, as the drone 102 continues to lower the package 110 into the net 158, the first position sensor 168 may no longer detect the presence of the package 110 after it has been lowered completely below the first plane 170. If not, then the process may go back to block 226. If the package 110 is lowered further, the second position sensor 172 may no longer detect the presence of the package 110 after it has been lowered completely below the second plane 174, as indicated at block 232. If no, the process may go back to block 230. If yes, this may indicate that the package 110 is in the correct position to be released by the drone 102 into the net 158, at block 236.

At blocks 238 and 240, the weight of the package 110 within the net 158 may be detected by the net sensors 176, which may indicate that the package 110 is disposed on the net 158. At block 242, the vehicle 104 may confirm to the drone that the package 110 has been received. The retractable cable 180 may then be retracted back to the drone 102, at blocks 244 and 246, and the access door 150 may be closed, at block 248. The drone 102 may fly away at block 252, and the vehicle 104 may exit the drone package delivery driving mode, at block 250. In addition, the net 158 may be lowered to the lowered position at blocks 254 and 256, and the package 110 may be removed from the net 158 by a sorting mechanism or the like within the vehicle 104.

EXAMPLES

In some instances, the following examples may be implemented together or separately by the systems and methods described herein.

Example 1 may include a method for delivering a package from a drone to a vehicle, the method comprising: identifying, by the drone, the vehicle; establishing, by the drone and the vehicle, a wireless communication connection between the drone and the vehicle; opening, by the vehicle, an access door of the vehicle to expose an opening in the vehicle, wherein a net configured to receive the package from the drone is disposed within the vehicle below the opening; and releasing, by the drone, the package into the net.

Example 2 may include the method of example 1, wherein releasing the package into the net comprises: positioning the drone about the opening in the vehicle; extending, by the drone, a retractable cable releasably attached to the package, wherein the package is extended via the retractable cable through the opening in the vehicle and positioned about the net; determining, by one or more position sensors in the vehicle, that the package is in the correct position about the net; releasing, by the drone and after it has been determined that the package is in the correct position about the net, the package into the net; and retracting, by the drone and after the package has been released into the net, the retractable cable.

Example 3 may include the method of example 2 and/or some other example herein, wherein the retractable cable comprises an electromagnetic attachment device disposed at a distal end thereof, and wherein the package comprises a magnetic element configured to be releasably attached to the electromagnetic attachment device.

Example 4 may include the method of example 3 and/or some other example herein, wherein the retractable cable comprises one or more sensors configured to determine the position and movement of the electromagnetic attachment device.

Example 5 may include the method of example 2 and/or some other example herein, wherein determining that the package is in the correct position about the net comprises: determining, by a first position sensor, that the package has been detected; determining, by a second position sensor disposed below the first position sensor, that the package has been detected; determining, by the first position sensor and after the first and second position sensors have determined that the package has been detected, that the package is no longer detected; and determining, by the second position sensor after the first position sensor has determined that the package is no longer detected, that the package is no longer detected.

Example 6 may include the method of example 1 and/or some other example herein, further comprising: elevating, by the vehicle, the net about the opening in the vehicle; determining, by one or more net sensors in the vehicle, that the package has been received by the net; and lowering, by the vehicle, the net and package therein.

Example 7 may include the method of example 6 and/or some other example herein, wherein determining that the package has been received by the net comprises determining, by a weight sensor in communication with the net, that the package is disposed on the net.

Example 8 may include the method of example 6 and/or some other example herein, further comprising closing, by the vehicle and after the package has been received by the net, the access door of the vehicle to close off the opening in the vehicle.

Example 9 may include the method of example 1 and/or some other example herein, wherein identifying the vehicle comprises detecting, by the drone, a machine-readable optical element disposed on the vehicle.

Example 10 may include the method of example 1 and/or some other example herein, wherein establishing the wireless communication connection between the drone and the vehicle comprises syncing the drone and the vehicle such that the drone is capable of monitoring, anticipating, and/or tracking movement of the vehicle.

Example 11 may include the method of example 1 and/or some other example herein, further comprising identifying, by the vehicle, the drone.

Example 12 may include a drone configured to deliver a package to a vehicle, the drone comprising: at least one memory that stores computer-executable instructions; and at least one processor configured to access the at least one memory, wherein the at least one processor is configured to execute the computer-executable instructions to: cause a sensor on the drone to detect the vehicle; establish a wireless communication connection with the vehicle; cause the drone to position itself adjacent to the vehicle; cause, after the drone is positioned adjacent to the vehicle, a retractable cable releasably attached to the package to extend; and cause the package to be released from the retractable cable.

Example 13 may include the drone of example 12, wherein the at least one processor is further configured to execute the computer-executable instructions to cause, after the package has been released, the retractable cable to retract.

Example 14 may include the drone of example 12 and/or some other example herein, wherein the retractable cable comprises an electromagnetic attachment device disposed at a distal end thereof, and wherein the package comprises a magnetic element configured to be releasably attached to the electromagnetic attachment device.

Example 15 may include the drone of example 14 and/or some other example herein, wherein the retractable cable comprises one or more sensors configured to determine the position and movement of the electromagnetic attachment device.

Example 16 may include a vehicle configured to receive a package from a drone, the vehicle comprising: at least one memory that stores computer-executable instructions; and at least one processor configured to access the at least one memory, wherein the at least one processor is configured to execute the computer-executable instructions to: establish a wireless communication connection with the drone; cause an access door of the vehicle to open to expose an opening in the vehicle, wherein a net configured to receive the package is disposed within the vehicle below the opening; and cause one or more position sensors in the vehicle to determine that the package is in a correct position about the net.

Example 17 may include the vehicle of example 16, wherein determining that the package is in the correct position about the net comprises the at least one processor being configured to execute the computer-executable instructions to: cause a first position sensor to determine that the package has been detected; cause a second position sensor disposed below the first position sensor to determine that the package has been detected; cause the first position sensor, after the first and second position sensors have determined that the package has been detected, to determine that the package is no longer detected; and cause the second position sensor, after the first position sensor has determined that the package is no longer detected, to determine that the package is no longer detected.

Example 18 may include the vehicle of example 16 and/or some other example herein, wherein the at least one processor is further configured to execute the computer-executable instructions to: cause the net to be elevated about the opening in the vehicle; cause one or more net sensors in the vehicle to determine that the package has been received by the net; and cause the net and package thereon to be lowered.

Example 19 may include the vehicle of example 18 and/or some other example herein, wherein determining that the package has been received by the net comprises the at least one processor being configured to execute the computer-executable instructions to cause a weight sensor in communication with the net to determine that the package is disposed on the net.

Example 20 may include the vehicle of example 18 and/or some other example herein, wherein the at least one processor is further configured to execute the computer-executable instructions to cause, after the package has been received by the net, the access door of the vehicle to close off the opening in the vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for delivering a package from a drone to a vehicle, the method comprising:
    identifying, by the drone, the vehicle;
    establishing, by the drone and the vehicle, a wireless communication connection between the drone and the vehicle;
    opening, by the vehicle, an access door of the vehicle to expose an opening in the vehicle, wherein a net configured to receive the package from the drone is disposed within the vehicle below the opening;
    releasing, by the drone, the package into the net, wherein releasing the package into the net comprises:
        positioning the drone about the opening in the vehicle;
        extending, by the drone, a retractable cable releasably attached to the package, wherein the package is extended via the retractable cable through the opening in the vehicle and positioned about the net;
        determining, by one or more position sensors in the vehicle, that the package is in the correct position about the net;
    releasing, by the drone and after it has been determined that the package is in the correct position about the net, the package into the net; and
    retracting, by the drone and after the package has been released into the net, the retractable cable.

2. The method of claim 1, wherein the retractable cable comprises an electromagnetic attachment device disposed at a distal end thereof, and wherein the package comprises a magnetic element configured to be releasably attached to the electromagnetic attachment device.

3. The method of claim 2, wherein the retractable cable comprises one or more sensors configured to determine the position and movement of the electromagnetic attachment device.

4. The method of claim 1, wherein determining that the package is in the correct position about the net comprises:
    determining, by a first position sensor, that the package has been detected;
    determining, by a second position sensor disposed below the first position sensor, that the package has been detected;
    determining, by the first position sensor and after the first and second position sensors have determined that the package has been detected, that the package is no longer detected; and
    determining, by the second position sensor after the first position sensor has determined that the package is no longer detected, that the package is no longer detected.

5. The method of claim 1, further comprising:
    elevating, by the vehicle, the net about the opening in the vehicle;
    determining, by one or more net sensors in the vehicle, that the package has been received by the net; and
    lowering, by the vehicle, the net and package therein.

6. The method of claim 5, wherein determining that the package has been received by the net comprises determining, by a weight sensor in communication with the net, that the package is disposed on the net.

7. The method of claim 5, further comprising closing, by the vehicle and after the package has been received by the net, the access door of the vehicle to close off the opening in the vehicle.

8. The method of claim 1, wherein identifying the vehicle comprises detecting, by the drone, a machine-readable optical element disposed on the vehicle.

9. The method of claim 1, wherein establishing the wireless communication connection between the drone and the vehicle comprises syncing the drone and the vehicle such that the drone is capable of monitoring, anticipating, and/or tracking movement of the vehicle.

10. The method of claim 1, further comprising identifying, by the vehicle, the drone.

11. A vehicle configured to receive a package from a drone, the vehicle comprising:
    at least one memory that stores computer-executable instructions; and
    at least one processor configured to access the at least one memory, wherein the at least one processor is configured to execute the computer-executable instructions to:
        establish a wireless communication connection with the drone;

cause an access door of the vehicle to open to expose an opening in the vehicle, wherein a net configured to receive the package is disposed within the vehicle below the opening;

cause one or more position sensors in the vehicle to determine that the package is in a correct position about the net, wherein determining that the package is in the correct position about the net comprises the at least one processor being configured to execute the computer-executable instructions to:

cause a first position sensor to determine that the package has been detected;

cause a second position sensor disposed below the first position sensor to determine that the package has been detected;

cause the first position sensor, after the first and second position sensors have determined that the package has been detected, to determine that the package is no longer detected; and cause the second position sensor, after the first position sensor has determined that the package is no longer detected, to determine that the package is no longer detected.

12. The vehicle of claim 11, wherein the at least one processor is further configured to execute the computer-executable instructions to:

cause the net to be elevated about the opening in the vehicle;

cause one or more net sensors in the vehicle to determine that the package has been received by the net; and cause the net and package thereon to be lowered.

13. The vehicle of claim 12, wherein determining that the package has been received by the net comprises the at least one processor being configured to execute the computer-executable instructions to cause a weight sensor in communication with the net to determine that the package is disposed on the net.

14. The vehicle of claim 12, wherein the at least one processor is further configured to execute the computer-executable instructions to cause, after the package has been received by the net, the access door of the vehicle to close off the opening in the vehicle.

15. A method for delivering a package from a drone to a vehicle, the method comprising:

identifying, by the drone, the vehicle;

establishing, by the drone and the vehicle, a wireless communication connection between the drone and the vehicle;

opening, by the vehicle, an access door of the vehicle to expose an opening in the vehicle, wherein a net configured to receive the package from the drone is disposed within the vehicle below the opening;

releasing, by the drone, the package into the net;

elevating, by the vehicle, the net about the opening in the vehicle;

determining, by one or more net sensors in the vehicle, that the package has been received by the net; and lowering, by the vehicle, the net and package therein.

16. The method of claim 15, wherein determining that the package has been received by the net comprises determining, by a weight sensor in communication with the net, that the package is disposed on the net.

17. The method of claim 15, further comprising closing, by the vehicle and after the package has been received by the net, the access door of the vehicle to close off the opening in the vehicle.

* * * * *